(12) United States Patent
Choi

(10) Patent No.: US 10,877,344 B2
(45) Date of Patent: Dec. 29, 2020

(54) DISPLAY DEVICE

(71) Applicant: LG Display Co., Ltd., Seoul (KR)

(72) Inventor: Youngdo Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/717,488

(22) Filed: Dec. 17, 2019

(65) Prior Publication Data

US 2020/0209697 A1 Jul. 2, 2020

(30) Foreign Application Priority Data

Dec. 28, 2018 (KR) .......................... 10-2018-0171792

(51) Int. Cl.
*G02F 1/1362* (2006.01)
*G02F 1/1333* (2006.01)

(52) U.S. Cl.
CPC .... *G02F 1/136286* (2013.01); *G02F 1/13338* (2013.01); *G02F 2001/13629* (2013.01); *G02F 2201/121* (2013.01); *G02F 2201/123* (2013.01)

(58) Field of Classification Search
None
See application file for complete search history.

(56) References Cited

U.S. PATENT DOCUMENTS

| 6,985,194 B2 | 1/2006 | Kawano et al. | |
| 2002/0054037 A1* | 5/2002 | Kawano | G02F 1/136259 345/205 |
| 2005/0270435 A1* | 12/2005 | Shiau | G02F 1/136259 349/54 |
| 2008/0225196 A1* | 9/2008 | Kim | G02F 1/136259 349/54 |
| 2017/0269446 A1* | 9/2017 | Sang | G02F 1/134309 |
| 2018/0120994 A1* | 5/2018 | Yoo | G06F 3/044 |
| 2019/0319052 A1* | 10/2019 | Yoshida | G06F 3/04164 |

FOREIGN PATENT DOCUMENTS

EP 3316103 A1 5/2018

OTHER PUBLICATIONS

Extended European Search Report, European Patent Application No. 19217832.5, dated Apr. 22, 2020, 5 pages.

* cited by examiner

*Primary Examiner* — Ryan Crockett
(74) *Attorney, Agent, or Firm* — Fenwick & West LLP

(57) ABSTRACT

A display device includes a first data line and a touch routing line in parallel, a first gate line intersected the first data line and the touch routing line, and a first sub-pixel defined according to intersection of the first data line, the touch routing line and the first gate line, the first sub-pixel includes a transistor at the intersection of the first data line and the first gate line, a pixel electrode connected to the transistor, and a common electrode overlapped on the pixel electrode, the common electrode includes a common electrode connector extending to a second sub-pixel neighboring the first sub-pixel, the touch routing line and the common electrode connector overlap with each other, a repair portion is included in an area in which the pixel electrode and the touch routing line overlap, and the common electrode connector does not overlap with the repair portion.

17 Claims, 12 Drawing Sheets

FIG. 13A
FIG. 13B
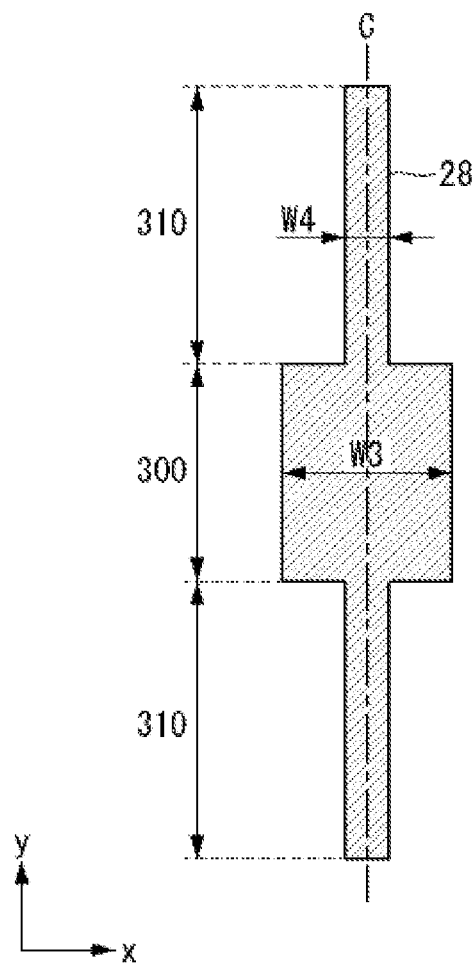
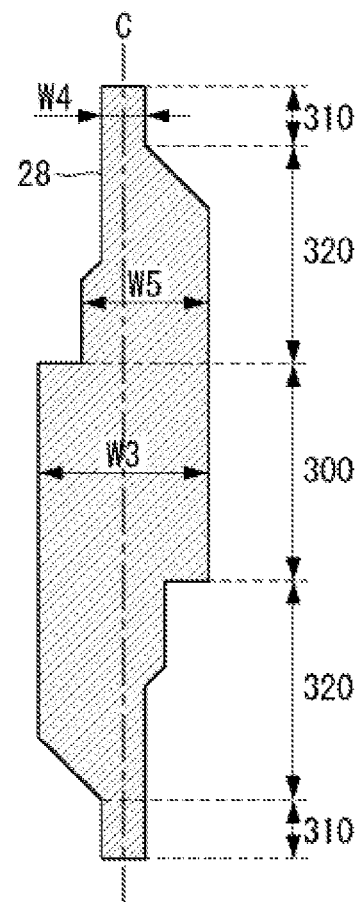

FIG. 15A
FIG. 15B
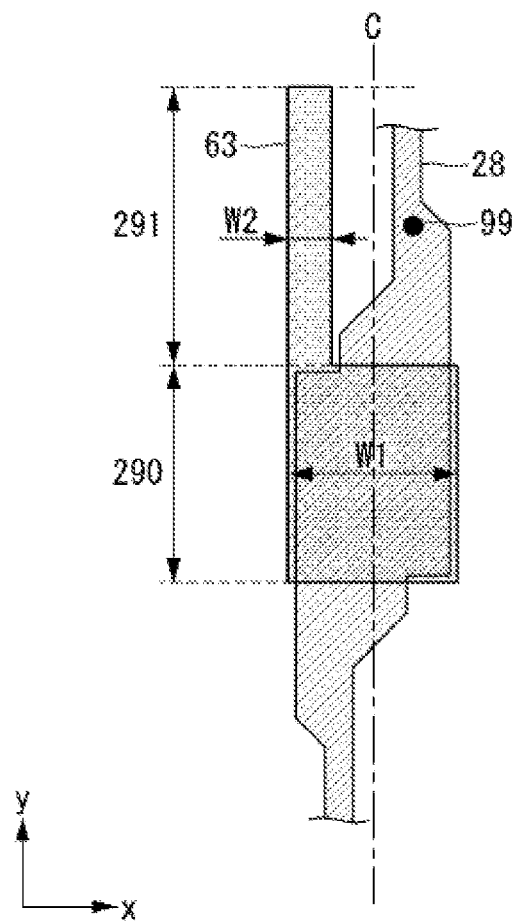
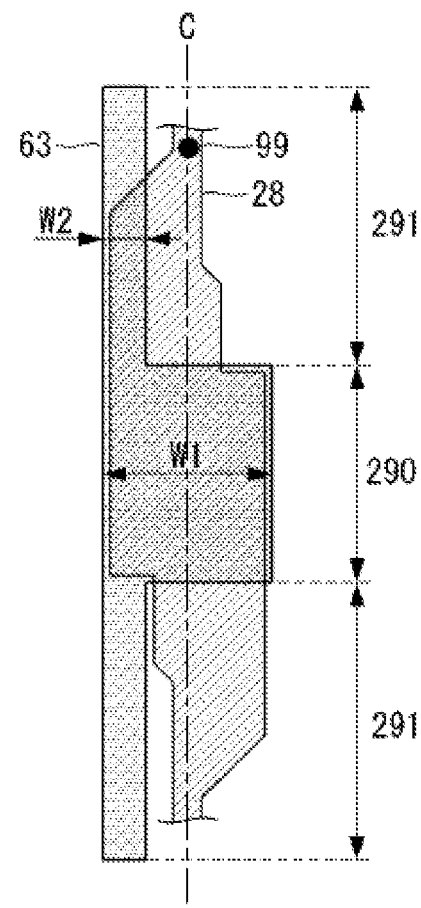

DISPLAY DEVICE

CROSS-REFERENCE TO RELATED APPLICATIONS

This application claims the priority of the Republic of Korea Patent Application No. 10-2018-0171792 filed on Dec. 28, 2018, in the Korean Intellectual Property Office, the disclosure of which is incorporated herein by reference in its entirety.

BACKGROUND

Field of Technology

The present disclosure relates to a display device capable of preventing a touch sensing error.

Related Art

Recently, a variety of flat panel display devices such as a liquid crystal display (LCD) device, an organic light emitting diode (OLED) display device, a plasma display panel (PDP) device and an electrophoretic display (EPD) device have been developed. An LCD device displays images by controlling electric fields applied to liquid crystal molecules according to a data voltage. An active matrix type LCD device includes a thin film transistor (TFT) formed at each pixel. Pixels of the LCD device may be divided into R sub-pixels, G sub-pixels, B sub-pixels and W sub-pixels to represent colors and improve luminance. Hereinafter, a display device in which pixels are divided into RGBW sub-pixels is referred to as an "RGBW type display device".

An LCD device includes a liquid crystal display panel, a back light unit for radiating light to the liquid crystal display panel, a source drive integrated circuit (IC) for providing data voltages to data lines of the liquid crystal display panel, a gate drive IC for providing gate pulses (or scan pulses) to gate lines (or scan lines) of the liquid crystal display panel, a control circuit for controlling the ICs, a light source driver for driving a light source of the back light unit, and the like.

SUMMARY

A LCD device is driven in an inversion mode in which data voltages having opposite polarities are charged in neighboring sub-pixels and the data voltage polarities are periodically inverted in order to reduce DC afterimage and prevent liquid crystal deterioration. Horizontal and vertical 1-dot inversion or horizontal 1-dot and vertical 2-dot inversion is applied to most LCD devices. 1 dot refers to 1 sub-pixel.

Recently, double rating driving (DRD) for reducing the number of data lines in half and doubling the number of gate lines through frequency increase has been applied to LCD devices. DRD is a technique for decreasing the number of source drive ICs in half by sequentially driving sub-pixels with two sub-pixels sharing one data line, thereby reducing costs.

However, a sub-pixel structure for DRD has a complicated design because channels and pixel electrodes are arranged zigzag.

The present invention provides a display device which includes a self-capacitance type touch sensor and sub-pixels for DRD and can prevent a touch sensing error during a sub-pixel repair process.

According to one aspect of the present technique a display device is presented. The display device includes a first data line disposed on a substrate, a touch routing line which may be disposed in parallel with the first data line, a first gate line which may intersect the first data line and the touch routing line, and a first sub-pixel defined according to intersection of the first data line, the touch routing line and the first gate line. The first sub-pixel may include a thin film transistor disposed at the intersection of the first data line and the first gate line. The first sub-pixel may further include a pixel electrode connected to the thin film transistor and a common electrode overlapped on the pixel electrode. The common electrode may include a common electrode connector extending to a second sub-pixel neighboring the first sub-pixel. The touch routing line and the common electrode connector may be disposed to overlap with each other. A repair portion is included in an area in which the pixel electrode and the touch routing line overlap. The common electrode connector may not overlap with the repair portion.

In the display device, the common electrode connector may include a center part and line parts respectively extended to one side and the other side from the center part.

The center part has a first width, the line parts have a second width, and the first width may be greater than the second width.

The line parts may be disposed on different sides on the basis of a center line of the center part. The line parts may be disposed on both sides of the central part along the central line.

The touch routing line may include a center part, extended parts respectively extended to one side and the other side from the center part, and line parts respectively extended from the extended parts.

The center part has a third width, the extended parts have a fifth width, and the line parts have a fourth width, wherein the third width may be greater than each of the fourth width and the fifth width. Optionally, the fifth width is greater than the fourth width. Optionally, each extended part may be formed such that a first part i.e. a left-hand side part and a second part i.e. a right-hand side part of each extended part with respect to the central line is asymmetrical, for example a width of the left-hand side part and a width of the right-hand side part of each extended part may be different from each other.

The common electrode connector and the touch routing line may be formed i.e. shaped and mutually arranged in the display device such that line parts of the common electrode connector and the line parts of the touch routing line do not overlap with each other.

Optionally, the center part of the common electrode connector and the center part of the touch routing line may overlap with each other.

The touch routing line may be electrically short-circuited with respect to the common electrode.

The present disclosure according to another aspect presents a display device includes: a first data line and a second data line disposed on a substrate and arranged in parallel with each other; a touch routing line disposed between the first and second data lines and arranged in parallel with the first data line; a first gate line and a second gate line intersected the first data line and the touch routing line; and a first sub-pixel defined according to intersection of the first data line, the touch routing line and the first gate line, and a second sub-pixel defined according to intersection of the second data line, the touch routing line and the second gate line, wherein the first sub-pixel may include a thin film transistor disposed at the intersection of the second data line and the first gate line, a pixel electrode connected to the thin film transistor, and a common electrode overlapped on the pixel electrode, and the second sub-pixel may include a thin film transistor disposed at the intersection of the first data line and the second gate line, a pixel electrode connected to the thin film transistor, and a common electrode overlapped on the pixel electrode, wherein the common electrode of the first sub-pixel may include a common electrode connector overlapping with a neighboring touch routing line, the common electrode of the first sub-pixel being electrically short-circuited with respect to the common electrode of the second sub-pixel, a repair portion may be included in an area in which the pixel electrode of the first sub-pixel and the touch routing line overlap, and the common electrode connector may not overlap with the repair portion.

The common electrode connector may include a center part and a line part extended to one side from the center part.

The center part may have a first width, the line part may have a second width, and the first width may be greater than the second width.

The line part may be disposed on one side on the basis of a center line of the center part.

The touch routing line may include a center part, extended parts respectively extended to one side and the other side from the center part, and line parts respectively extended from the extended parts.

The center part may have a third width, the extended parts may have a fifth width, the line parts may have a fourth width, the third width may be greater than the fourth width and the fifth width, and the fifth width may be greater than the fourth width.

The line part of the common electrode connector may not overlap with the line parts of the touch routing line.

The center part of the common electrode connector may overlap and come into contact with the center part of the touch routing line.

The touch routing line is electrically short-circuited with respect to the common electrode.

The present disclosure also presents a display device that includes: a first data line and a second data line disposed on a substrate and that may be arranged in parallel with each other, a touch routing line that may be disposed between the first and second data lines and that may be arranged in parallel with the first data line, a first gate line and a second gate line that may intersect the first data line and the touch routing line. A first sub-pixel may be defined according to intersection of the first data line, the touch routing line and the first gate line. A second sub-pixel may be defined according to intersection of the second data line, the touch routing line and the second gate line. The first sub-pixel may include a thin film transistor disposed at the intersection of the first data line and the first gate line, a pixel electrode connected to the thin film transistor, and a common electrode overlapped on the pixel electrode. The second sub-pixel may include a thin film transistor disposed at the intersection of the second data line and the second gate line, a pixel electrode connected to the thin film transistor, and a common electrode overlapped on the pixel electrode. The common electrode of the first sub-pixel may include a common electrode connector extending to a third sub-pixel that may be disposed adjacent to the first sub-pixel in a direction in which the touch routing line extends. The common electrode of the first sub-pixel may be electrically short-circuited with respect to the common electrode of the second sub-pixel. The touch routing line and the common electrode connector may be disposed to overlap with each other. A repair portion may be included in an area in which the pixel electrode of the first sub-pixel and the touch routing line overlap. The common electrode connector and the repair portion may overlap.

The common electrode connector may include a center part and line parts respectively extended to one side and the other side from the center part.

The center part has a first width, the line parts have a second width, and the first width may be greater than the second width.

The line parts may be disposed on the same side on the basis of a center line of the center part.

The touch routing line includes a center part, extended parts respectively extended to one side and the other side from the center part, and line parts respectively extended from the extended parts.

The center part has a third width, the extended parts have a fifth width, and the line parts have a fourth width. The third width may be greater than the fourth width and the fifth width. The fifth width may be greater than the fourth width.

The line parts of the common electrode connector may not overlap with the line parts of the touch routing line.

The center part of the common electrode connector may overlap and comes into contact with the center part of the touch routing line.

The touch routing line may be connected to the common electrode of the first sub-pixel and electrically short-circuited with respect to the common electrode of the second sub-pixel.

A display device including: a first data line and a second data line disposed on a substrate and that may be arranged in parallel with each other, a touch routing line that may be disposed between the first and second data lines and that may be arranged in parallel with the first data line, a first gate line and a second gate line that may intersect the first data line and the touch routing line. and a first sub-pixel defined according to intersection of the first data line, the touch routing line and the first gate line, and a second sub-pixel defined according to intersection of the second data line, the touch routing line and the second gate line. The first sub-pixel may include a thin film transistor disposed at the intersection of the second data line and the first gate line, a pixel electrode connected to the thin film transistor, and a common electrode overlapped on the pixel electrode. The second sub-pixel may include a thin film transistor disposed at the intersection of the first data line and the second gate line, a pixel electrode connected to the thin film transistor, and a common electrode overlapped on the pixel electrode. The common electrode of the first sub-pixel includes a common electrode connector that may be overlapping with a neighboring touch routing line. The common electrode of the first sub-pixel may be electrically short-circuited with respect to the common electrode of the second sub-pixel. A repair portion may be included in an area in which the pixel electrode of the first sub-pixel and the touch routing line overlap. The common electrode connector may not overlap with the repair portion.

The common electrode connector includes a center part and a line part extended to one side from the center part.

The center part has a first width, the line part has a second width, and the first width may be greater than the second width.

The line part is disposed on one side on the basis of a center line of the center part.

The touch routing line includes a center part, extended parts respectively extended to one side and the other side from the center part, and line parts respectively extended from the extended parts.

The center part has a third width, the extended parts have a fifth width, and the line parts have a fourth width. The third width may be greater than the fourth width and the fifth width. The fifth width may be greater than the fourth width.

The line part of the common electrode connector may not overlap with the line parts of the touch routing line.

The center part of the common electrode connector may overlap and may come into contact with the center part of the touch routing line.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 13A and 13B are diagrams showing shapes of touch routing lines according to an embodiment of the present disclosure;

FIGS. 15A and 15B are plan views showing shapes of a common electrode connector shown in FIG. 14.

DETAILED DESCRIPTION

The advantages, features and methods for accomplishing the same of the disclosure will become more apparent through the following detailed description with respect to the accompanying drawings. However, the disclosure is not limited by embodiments described blow and is implemented in various different forms, and the embodiments are provided so that this disclosure will be thorough and complete, and will fully convey the scope of the invention to those skilled in the art. The disclosure is defined by the scope of the claims.

Shapes, sizes, ratios, angles, numbers, etc. shown in the figures to describe embodiments of the disclosure are exemplary and thus are not limited to particulars shown in the figures. Like numbers refer to like elements throughout the specification. It will be further understood that when the terms "include", "have" and "comprise" are used in this specification, other parts may be added unless "~only" is used. An element described in the singular form is intended to include a plurality of elements unless context clearly indicates otherwise.

In interpretation of a component, the component is interpreted as including an error range unless otherwise explicitly described.

In the description of the various embodiments of the disclosure, when describing positional relationships, for example, when the positional relationship between two parts is described using "on", "above", "below", "aside", or the like, one or more other parts may be located between the two parts unless the term "directly" or "closely" is used.

In the following description of the embodiments, "first" and "second" are used to describe various components, but such components are not limited by these terms. The terms are used to discriminate one component from another component. Accordingly, a first component mentioned in the following description may be a second component within the technical concept of the disclosure.

Features of embodiments of the present disclosure can be coupled or combined partially or overall and technically interoperated in various manners, and the embodiments may be implemented independently or associatively.

Hereinafter, a display device according to embodiments of the disclosure will be described in detail with reference to the attached drawings. Like numbers refer to like elements throughout the specification. In the following description, if a detailed description of known functions or configurations associated with the light emitting display device would unnecessarily obscure the gist of the disclosure, detailed description thereof will be omitted.

Figure 1:
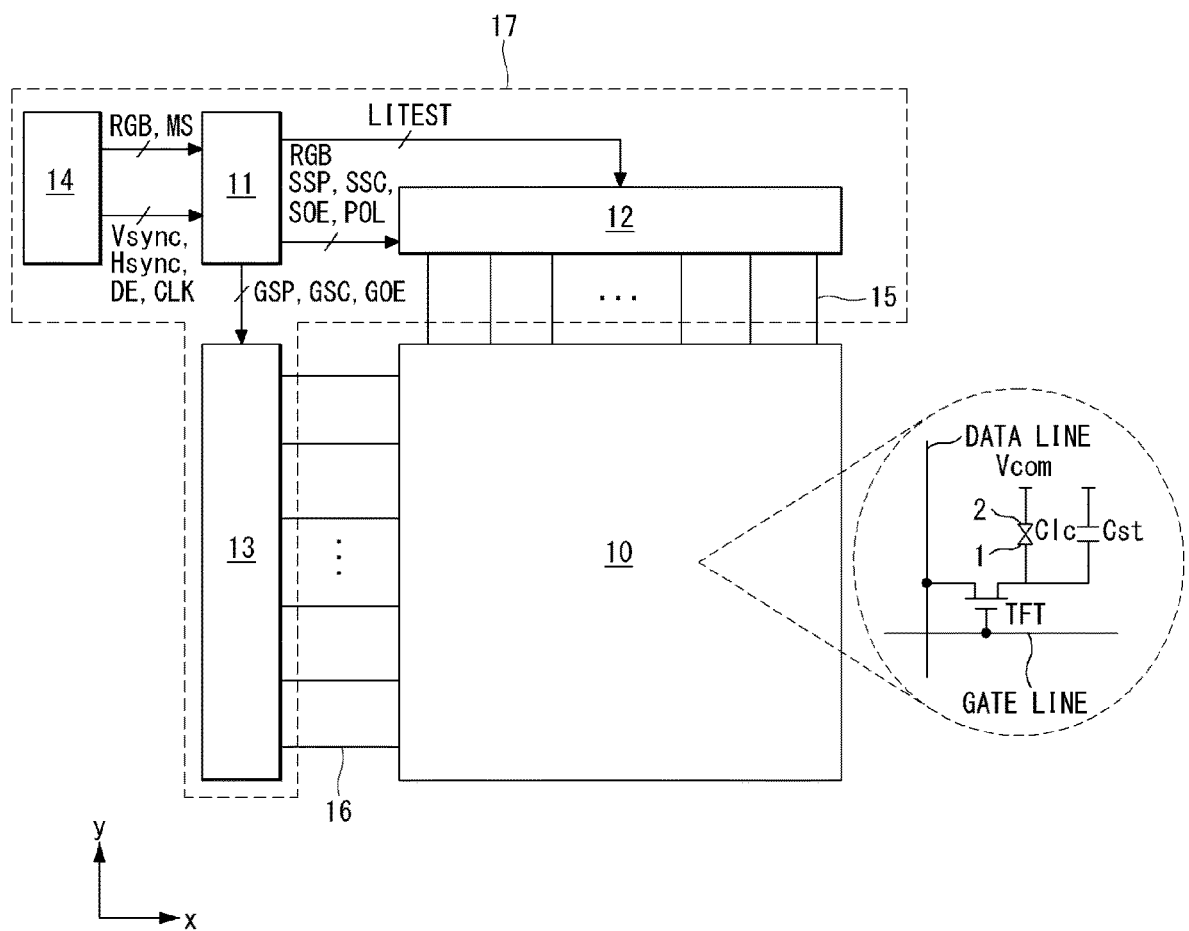
FIG. 1 is a block diagram of an LCD device according to an embodiment of the present disclosure.
Figure 2:
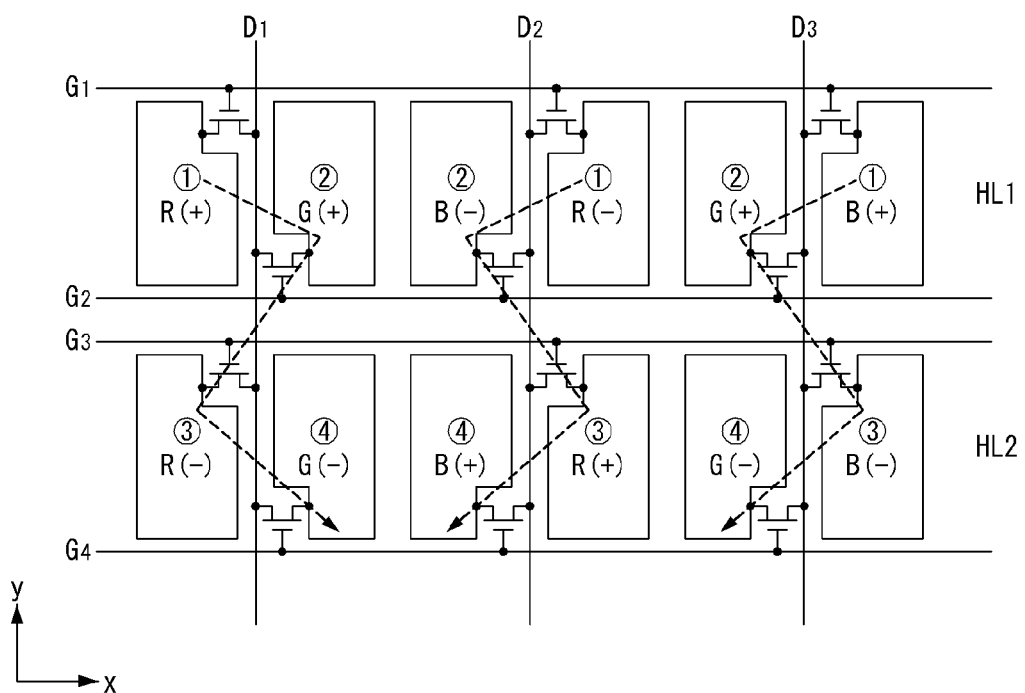
FIG. 2 is a diagram showing DRD of the LCD device according to an embodiment of the present disclosure.
Figure 3:
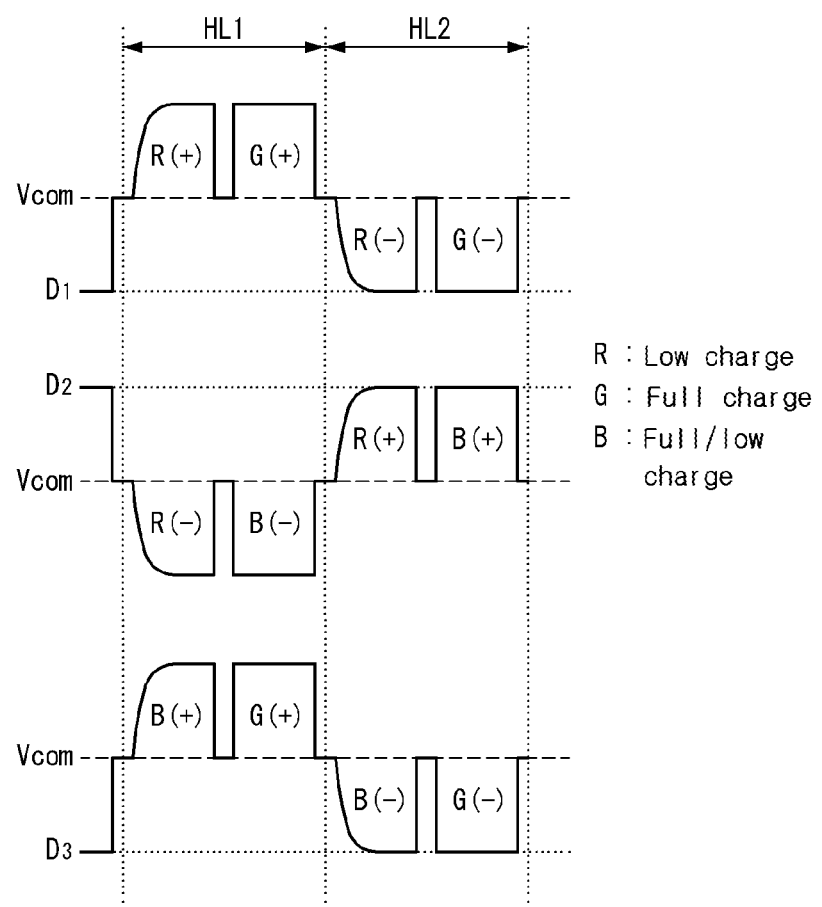
FIG. 3 is a diagram showing charging voltage waveforms in each liquid crystal cell when liquid crystal cells are charged in the direction of an arrow according to an embodiment of the present disclosure.

FIG. 1 is a block diagram of an LCD device according to an embodiment of the present invention, FIG. 2 is a diagram showing DRD of the LCD device of the present disclosure, and FIG. 3 is a diagram showing charging voltage waveforms in each liquid crystal cell when liquid crystal cells are charged in the direction of an arrow.

Referring to FIG. 1, a display device according to the present disclosure may be implemented as a flat panel display such as a liquid crystal display (LCD) device, a field emission display (FED) device, a plasma display panel (PDP) device, an organic light emitting diode (OLED) display device, or an electrophoresis display (EPD) device or the like. Although the display device is an LCD device in the following description, the display device of the present disclosure is not limited thereto.

An LCD panel 10 includes a liquid crystal layer formed between two glass substrates. The LCD panel 10 includes liquid crystal cells Clc arranged in a matrix form according to an intersection structure of data lines 15 and gate lines 16.

A pixel array is formed on a lower substrate of the LCD panel 10. The pixel array includes liquid crystal cells (pixels) Clc formed at intersections of the data lines 15 and the gate lines 16, thin film transistors (TFTs) connected to pixel electrodes 1 of the pixels, common electrodes 2 opposite the pixel electrodes 1, and storage capacitors Cst. Each liquid crystal cell Clc is connected to a switching transistor TFT and driven by electric fields between the pixel electrode 1 and the common electrode 2. A black matrix, red (R), green (G) and blue (B) color filters, and the like are formed on an upper substrate of the LCD panel 10. A polarizer is attached to each of the upper substrate and the lower substrate and an alignment film for setting a pre-tilt angle of liquid crystal is formed thereon. The common electrodes 2 are formed on the lower substrate along with the pixel electrodes 1 in horizontal field driving modes such as an in-plane switching (IPS) mode and a fringe field switching (FFS) mode.

The LCD panel 10 applicable to the present disclosure can be realized in any liquid crystal mode as well as the IPS mode and the FFS mode. The LCD device of the present disclosure can be implemented as any type such as a transmissive LCD device, a transflective LCD device, or a reflective LCD device. The transmissive LCD device and the transflective LCD device require a back light unit. The back light unit may be implemented as a direct type back light unit or an edge type back light unit.

The display device of the present disclosure includes a driver 17 for driving the LCD panel 10. The driver 17 changes operation modes according to whether image data RGB input from an external system is a moving image or a still image. For example, the driver 17 operates in a high-speed operation mode having a high driving frequency when the image data RGB is a moving image and operates in a low-speed operation mode having a low driving frequency when the image data RGB is a still image. To this end, the driver 17 includes a host system 14, a timing controller 11, a source driver 12, and a gate driver 13.

The host system 14 receives image data RGB from an external system, generates an operation mode signal MS corresponding to the image data RGB and outputs the operation mode signal MS to the timing controller 11. Specifically, the host system 14 generates an operation mode signal MS corresponding to a moving image when the image data RGB is the moving image and generate an operation mode signal MS corresponding to a still image when the image data TGB is the still image. The operation mode signal MS is a signal for a high-speed mode operation when the image data RGB corresponds to a moving image and a signal for a low-speed mode operation for reducing power consumption when the image data RGB corresponds to a still image.

The timing controller 11 receives digital video data RGB of an input image from the host system 14 through low voltage differential signaling (LVDS) interfacing and provides the digital video data RGB of the input image to the source driver 12 through mini-LVDS interfacing. In addition, the timing controller 11 receives the operation mode signal MS from the host system 14. The timing controller 11 aligns the digital video data RGB input from the host system 14 in accordance with a pixel array arrangement and then provides the digital video data RGB to the source driver 12.

The timing controller 11 receives timing signals such as a vertical synchronization signal Vsync, a horizontal synchronization signal Hsync, a data enable signal DE, and a dot clock signal CLK and generates control signals for controlling operation timings of the source driver 12 and the gate driver 13. The control signals include a gate timing control signal for controlling the operation timing of the gate driver 13 and a source timing control signal for controlling the operation timing of the source driver 12.

The gate timing control signal includes a gate start pulse signal GSP, a gate shift clock signal GSC, a gate output enable signal GOE, and the like. The gate start pulse signal GSP is applied to a gate driver integrated circuit (IC) that generates a first gate pulse to control the gate driver IC such that the first gate pulse is generated. The gate shift clock signal GSC is a clock signal commonly input to gate drive ICs to shift gate start pulses GSP. The gate output enable signal GOE controls output of the gate drive ICs.

The source timing control signal includes a source start pulse signal SSP, a source shift sampling clock signal SSC, a polarity control signal POL, a source output enable signal SOE, and the like. The source start pulse signal SSP controls a data sampling start timing of the source driver 12. The source sampling clock signal SSC is a clock signal for controlling a data sampling timing in the source driver 12 on the basis of a rising or falling edge. The polarity control signal POL controls polarities of data voltages sequentially output from source drive ICs. The source output enable signal SOE controls an output timing of the source driver 12.

The timing controller 11 temporally divides one frame into n (n is a positive integer equal to or greater than 2) subframes and dispersively drives the gate lines 16 through the subframes to realize an interlace operation. The timing controller 11 groups the gate lines 16 into n gate groups and correlates the n gate groups to the n subframes in driving order thereof.

The timing controller 11 controls the operation of the gate driver 13 to complete sequential scanning of the gate lines 16 included in the corresponding gate group for 1/n period of one subframe period and generates a buffer operation control signal LITEST to cut off driving power (a high driving voltage and a ground voltage) applied to buffers of the source driver 12 during (n−1)/n period other than the 1/n period in the one subframe period in each subframe. That is, the timing controller 11 controls the source driver 12 such that the operation of the source driver 12 is stopped during a skip period and cuts off driving power applied to the source driver 12 to remove static current flowing through the buffers of the source driver 12, thereby remarkably reducing power consumption.

The source driver 12 includes a shift register, a latch array, a digital-to-analog converter, and an output circuit. The source driver 12 latches the digital video data RGB according to the source timing control signal, converts the latched data into analog positive/negative gamma compensation voltages and provides data voltages whose polarities are inverted in a predetermined period to the data lines 15 through a plurality of output channels. The output circuits include a plurality of buffers. The buffers are connected to the output channels, and the output channels are one-to-one connected to the data lines 15. The source driver 12 controls polarities of data voltages output to the output channels through a column inversion method in order to reduce power consumption. The polarity of a data voltage output from the same output channel is inverted in units of subframe, and polarities of data voltages output from neighboring output channels are opposite to each other.

The gate driver 13 provides gate pulses to the gate lines 16 according to gate timing control signals through the aforementioned interlace operation method using a shift register and a level shifter. The source driver 12 and the gate driver 13 may be mounted in a chip on glass (COG) or chip on film (COF) structure. Further, the gate driver 13 may be directly formed on the lower substrate in a gate-driver in panel structure.

Referring to FIG. 2, an LCD device driven according to DRD drives m (m is a natural number equal to or greater than 2) liquid crystal cells disposed in one horizontal line using two gate lines and m/2 data lines. This DRD LCD drives data drive ICs in a vertical 2-dot inversion mode in order to minimize flicker and reduce power consumption. Accordingly, two liquid crystal cells that neighbor having a data line disposed therebetween are respectively connected to two gate lines and charged with a data voltage having the same polarity provided through the data line.

For example, in a specific frame, an R liquid crystal cell and a G liquid crystal cell sharing a first data line D1 among liquid crystal cells disposed in a first horizontal line HL1 are sequentially charged with positive polarity in synchronization with scan pulse supply timing from the gate lines G1 and G2, an R liquid crystal cell and a B liquid crystal cell sharing a second data line D2 are sequentially charged with negative polarity in synchronization with scan pulse supply timing from the gate lines G1 and G2, and a B liquid crystal cell and a G liquid crystal cell sharing a third data line D3 are sequentially charged with positive polarity in synchronization with scan pulse supply timing from the gate lines G1 and G2. Arrow directions shown in FIG. 2 represent charging orders of liquid crystal cells connected to the respective data lines.

Referring to FIGS. 2 and 3, a positive-polarity voltage (or a negative-polarity voltage) rising (or falling) from a negative-polarity voltage (or a positive-polarity voltage) is applied to R liquid crystal cells connected to the first or third gate line G1 or G3, and a positive-polarity voltage (or a negative-polarity voltage) changing from a positive-polarity voltage (or a negative-polarity voltage) is applied to G liquid crystal cells connected to the second or fourth gate line G2 or G4. Further, the positive-polarity voltage (or negative-polarity voltage) rising (or falling) from the negative-polarity voltage (or positive-polarity voltage) is applied to B liquid crystal cells connected to the first or third gate line G1 or G3, and the positive-polarity voltage (or negative-polarity voltage) changing from the positive-polarity voltage (or negative-polarity voltage) is applied to B liquid crystal cells connected to the second or fourth gate line G2 or G4.

Although the LCD device driven according to DRD has been described, the present disclosure is not limited thereto and can also be applied to LCD devices driven in various driving methods in addition to DRD.

The LCD device of the present disclosure may be an LCD device including a self-capacitance type touch sensor. However, the LCD device of the present disclosure can be applied to a mutual capacitance type. The self-capacitance type touch sensor determines whether touch is applied by measuring capacitance variations in a plurality of independent patterns formed in a touch area.

Figure 4:
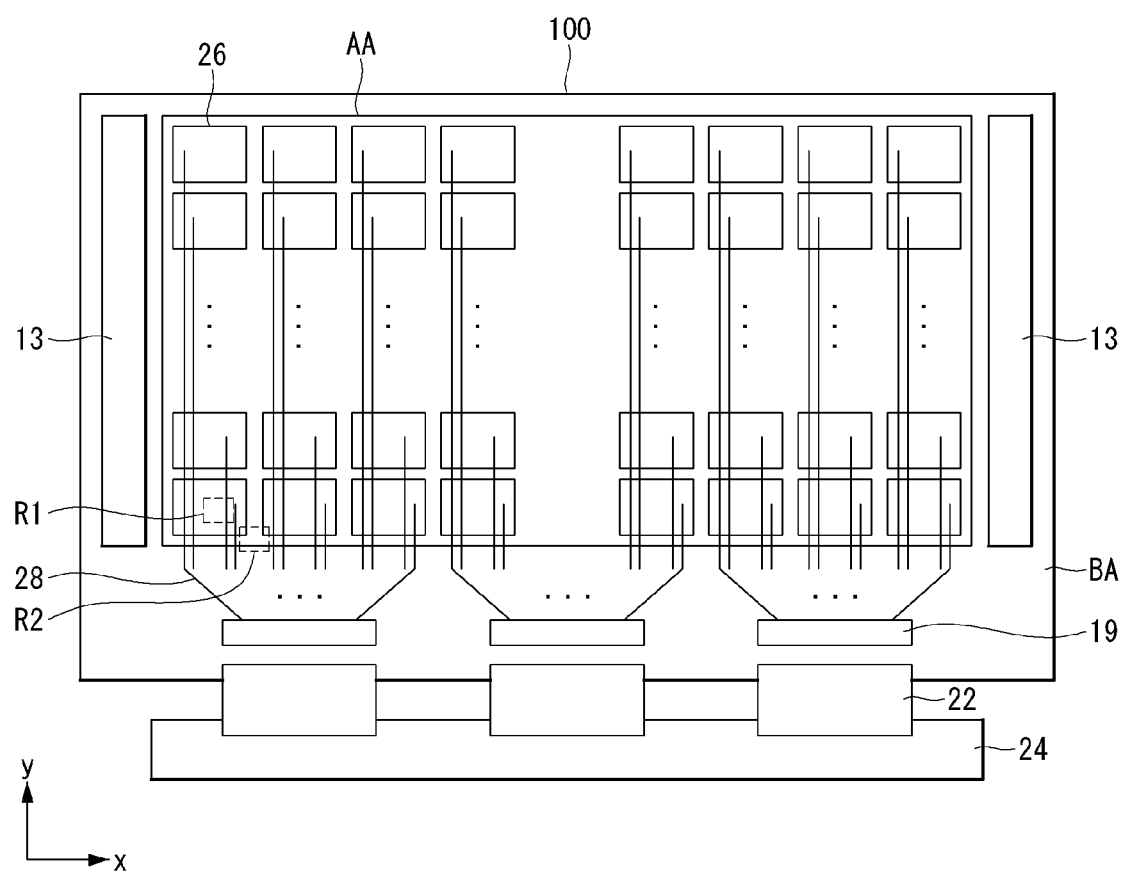
FIG. 4 is a plan view showing an LCD device including a self-capacitance type touch sensor according to an embodiment of the present disclosure.

FIG. 4 is a plan view showing an LCD device including a self-capacitance type touch sensor according to an embodiment of the present disclosure.

Referring to FIG. 4, a touch sensor integrated display device includes a display area AA which includes touch electrodes formed on a substrate 100 and displays data, and a bezel area BA disposed around the display area AA. Gate drivers 13 are disposed in the bezel area BA, and source and touch drivers 19 are disposed under the display area AA. A flexible printed circuit (FPC) 22 is attached to an edge of the substrate 100 and connected to an external printed circuit board (PCB) 24.

The display area AA includes a plurality of touch electrodes 26 arranged in a first direction (e.g., x-axis direction) and a second direction (e.g., y-axis direction) intersecting each other, and a plurality of touch routing lines 28 respectively connected to the plurality of touch electrodes 26 and arranged in parallel in the second direction.

The plurality of touch electrodes 26 in the display area AA are formed by dividing common electrodes of the display device, and operate as common electrodes in a display mode of displaying data and operate as touch electrode in a touch mode of recognizing a touch point.

The bezel area BA is disposed around the display area AA and includes the source and touch drivers 19 and various interconnection lines. The gate drivers 13 drive gate lines of the display device in the display mode. The source and touch drivers 19 provide display data to data lines and provide a common voltage to the touch electrodes (common electrodes) 26 in the display mode. Further, the source and touch drivers 19 provide touch driving voltages to the touch electrodes and determine positions of touch electrodes to which a touch is applied by scanning capacitance variations in the touch electrodes before and after the touch is applied in the touch mode. Various interconnection lines include the touch routing lines 28 connected to the touch electrodes 26, gate lines connected to the source and touch drivers 19, and data lines.

Figure 5:
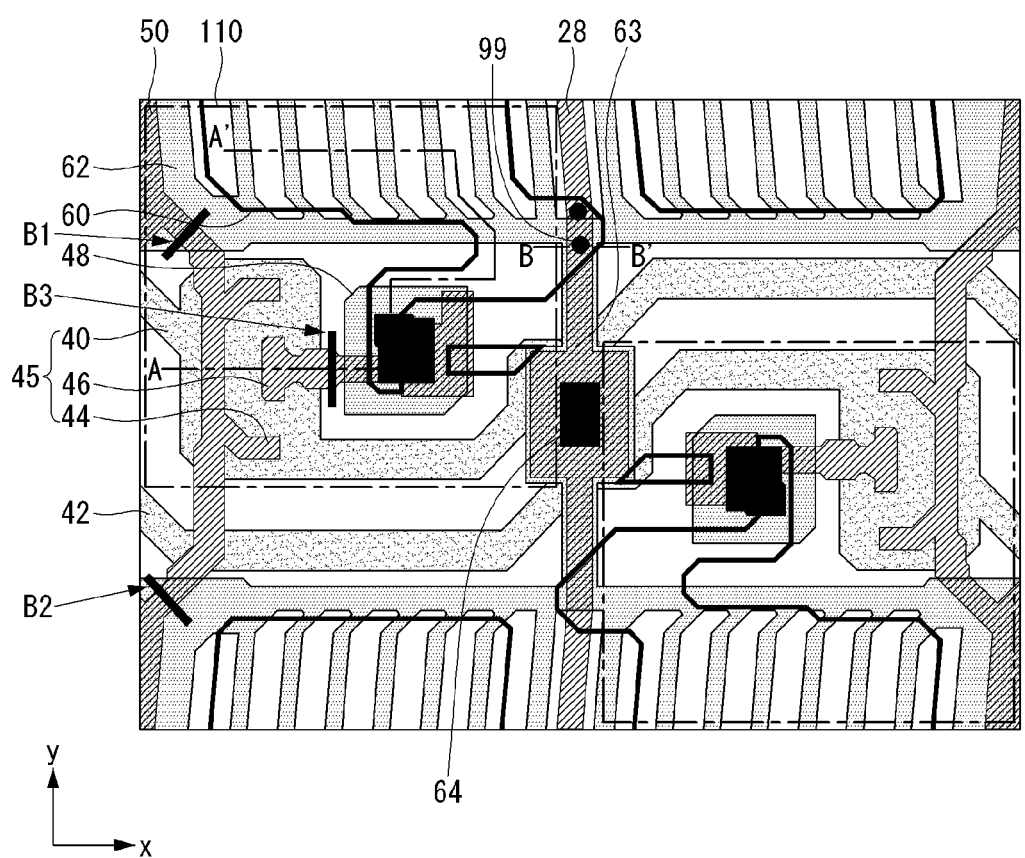
FIG. 5 is an enlarged plan view of an area R1 of FIG. 4 according to an embodiment of the present disclosure.
Figure 6:
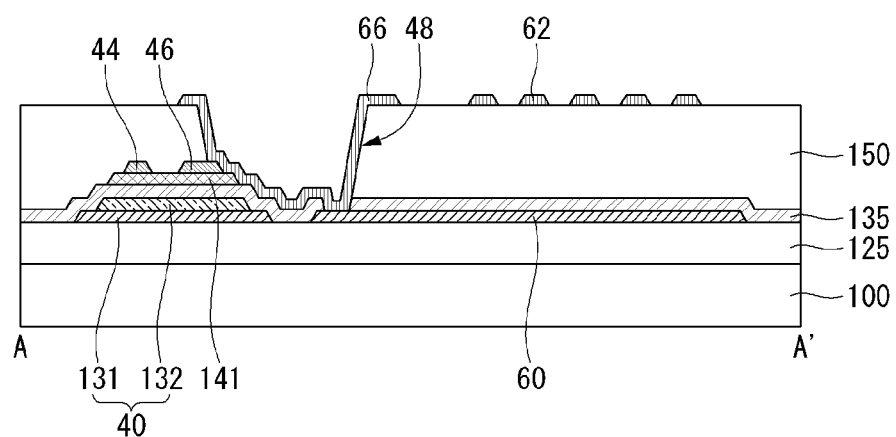
FIG. 6 is a cross-sectional view taken along line A-A' of FIG. 5 according to an embodiment of the present disclosure.
Figure 7:
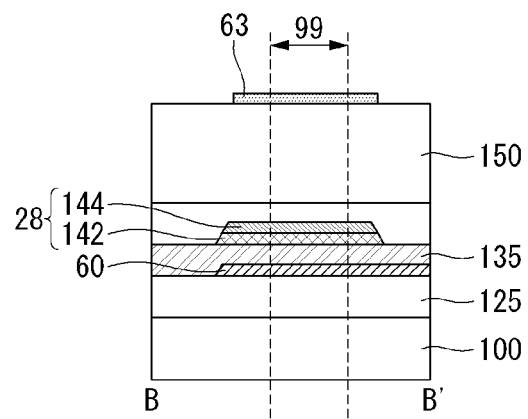
FIG. 7 is a cross-sectional view taken along line B-B' of FIG. 5 according to an embodiment of the present disclosure.

Hereinafter, a sub-pixel structure at the center of a touch electrode in the display device according to an embodiment of the present disclosure will be described with reference to FIG. 5. FIG. 5 is an enlarged plan view of an area R1 of FIG. 4, FIG. 6 is a cross-sectional view taken along line A-A' of FIG. 5, and FIG. 7 is a cross-sectional view taken along line B-B' of FIG. 5.

Referring to FIG. 4, the plurality of touch electrodes 26 are disposed in the display area AA of the display device according to an embodiment of the present disclosure. In touch electrodes disposed in the last row of the first column of the display area AA among the touch electrodes 26, touch routing lines through which touch electrodes on one side are driven are disposed. For example, a touch electrode disposed in the first row of the first column at the uppermost part of the display area AA is connected to the first touch routing line which is the left-most touch routing line, and a touch electrode disposed in the second row of the first column is connected to the second touch routing line. In addition, a touch electrode disposed in the last row of the first column is connected to the right-most touch routing line. Accordingly, a plurality of touch routing lines pass through the touch electrode in the area R1 which is disposed in the last row of the first column.

Specifically, FIG. 5 is a plan view showing a relationship between a sub-pixel in the touch electrode disposed in the last row of the first column in FIG. 4 and a touch routing line.

Referring to FIG. 5, a first gate line 40 and a second gate line 42 extend in the first direction (x-axis direction). The touch routing line 28 is disposed to intersect the first gate line 40 and the second gate line 42. A first data line 50 is disposed to intersect the first gate line 40 and the second gate line 42.

An area defined by the first data line 50, the first gate line 40 and the touch routing line 28 corresponds to a first sub-pixel 110. The touch routing line 28 is not connected to the touch electrode in which the first sub-pixel 110 is disposed and is connected to a touch electrode disposed on one side of the first column.

The first sub-pixel 110 includes a thin film transistor 45 including the first gate line 40 serving as a gate electrode, a drain electrode 44 branched from the first data line 50, and a source electrode 46 opposite the drain electrode 44. The source electrode 46 of the thin film transistor 45 is in contact with a pixel electrode 60 through a contact hole 48. A common electrode 62 which forms electric fields along with the pixel electrode 60 is connected to a touch routing line which is not shown such that a common voltage and a touch driving voltage are applied to the common electrode 62. The common electrode 62 acts as a touch electrode disposed at the center of the first column and thus is connected to common electrodes of neighboring sub-pixels, which are included in the same touch electrode, to be one body.

The cross-sectional structure of the sub-pixel taken along line A-A' of FIG. 5 will be described with reference to FIG. 6.

Referring to FIG. 6, a buffer layer 125 is disposed on the substrate 100. The buffer layer 125 protects an element disposed thereon from particles from the substrate 100 disposed thereunder. The buffer layer 125 may be formed of a silicon nitride (SiNx) or a silicon oxide (SiOx), or formed from multiple layers thereof. The first gate line 40 and the pixel electrode 60 are disposed on the buffer layer 125. The first gate line 40 may be formed in a two-layer structure in which a lower layer 131 and an upper layer 132 are laminated. The lower layer 131 may be formed of indium tin oxide (ITO), indium zinc oxide (IZO), indium tin zinc oxide (ITZO), or the like. The upper layer 132 is a low-resistance metal layer and may be formed of one selected from a group consisting of molybdenum (Mo), aluminum (Al), chrome (Cr), gold (Au), titanium (Ti), nickel (Ni), neodymium (Nd) and copper (Cu) or an alloy thereof, or formed of indium tin oxide (ITO), indium zinc oxide (IZO), indium tin zinc oxide (ITZO) or the like.

The first gate line 40 and the pixel electrode 60 are simultaneously formed using a half-tone mask. Specifically, a metal oxide layer is formed on the substrate 100 and a metal layer is laminated thereon. Then, the metal oxide layer and the metal layer may be simultaneously patterned using a half-tone mask to form the lower layer 131 and the upper layer 132 of the first gate line 40 and the pixel electrode 60 made of only the metal oxide layer.

A gate insulating layer 135 is disposed on the first gate line 40 and the pixel electrode 60. The gate insulating layer 135 insulates the first gate line 40 and the pixel electrode 60 from each other and may be formed of a silicon nitride (SiNx) or a silicon oxide (SiOx) or formed from multiple layers thereof. A semiconductor layer 141 is disposed on a region of the gate insulating layer 135, which is overlapped on the first gate line 40. The semiconductor layer 141 may be made of a silicon semiconductor or an oxide semiconductor. The silicon semiconductor may include amorphous silicon or polysilicon. Here, the polysilicon can be applied to the gate driver and/or a multiplexer MUX or applied to driving transistors in pixels because it has high mobility (100 $cm^2$/Vs or higher) and thus has low energy consumption and high reliability. On the other hand, the oxide semiconductor has a low off-current and thus is suitable for a switching transistor which has a short ON period and maintains a long OFF period. Further, the oxide semiconductor is suitable for display devices which require low-speed operation and/or low power consumption because they have a long pixel voltage maintaining period since the oxide semiconductor has a low off-current. In addition, the semiconductor layer 141 includes drain and source regions containing a p-type or n-type impurity and a channel region interposed therebetween.

The drain electrode 44 and the source electrode 46 are disposed on the semiconductor layer 141. The drain electrode 44 and the source electrode 46 may be formed as a single layer or multiple layers and formed of one selected from a group consisting of molybdenum (Mo), aluminum (Al), chrome (Cr), gold (Au), titanium (Ti), nickel (Ni), neodymium (Nd) and copper (Cu), or an alloy thereof in the case of a single layer. In the case of multiple layers, the drain electrode 44 and the source electrode 46 may be formed as a double layer of molybdenum/aluminum-neodymium or a triple-layer of titanium/aluminum/titanium, molybdenum/aluminum/molybdenum or molybdenum/aluminum-neodymium/molybdenum.

A passivation layer 150 is disposed on the semiconductor layer 141, the source electrode 46 and the drain electrode 44. The passivation layer 150 may be formed of a silicon nitride (SiNx), a silicon oxide (SiOx) or formed as multiple layers thereof. The passivation layer 150 and the gate insulating layer 135 include a contact hole 48 exposing the sides of the source electrode 46 and the semiconductor layer 141 and the pixel electrode 60.

The common electrode 62 is disposed on the passivation layer 150 in which the contact hole 48 is formed. The common electrode 62 is made of the same material as the pixel electrode 60. A connection electrode 66 is disposed in an area separated from the common electrode 62. The connection electrode 66 is formed of the same material as the common electrode 62. The connection electrode 66 comes into contact with the sides of the source electrode 46 and the semiconductor layer 141 and the pixel electrode 60 through the contact hole 48. Accordingly, the pixel electrode 60 is connected to the source electrode 46 and thus a driving voltage can be applied thereto.

Meanwhile, the display device of the present invention is configured in a structure in which, when sub-pixels have defects such as bright spots, these bright spots can be repaired by being darkened.

Referring to FIG. 5, a connector 63 of the common electrode 62 of the first sub-pixel 110 is disposed in a region overlapping with the touch routing line 28. Here, when a defect such as a bright spot is generated in the first sub-pixel 110, a repair process for darkening the sub-pixel is performed. According to the repair process, both ends B1 and B2 of the first data line 50 connected to the thin film transistor 45 of the first sub-pixel 110 are cut and the source electrode 46 is cut at B3. Then, laser is radiated to a repair portion 99 to weld the common electrode 62 and the pixel electrode 60 which are disposed in the repair portion 99, thereby short-circuiting them. Since the short-circuited common electrode 62 and pixel electrode 60 form the same voltage, liquid crystal is not driven and thus the repair portion can be darkened.

FIG. 7 shows the cross-sectional structure of the repair portion 99. Referring to FIG. 7, the buffer layer 125 is disposed on the substrate 100 and the pixel electrode 60 is disposed on the buffer layer 125. The gate insulating layer 135 is disposed on the pixel electrode 60 and the touch routing line 28 is disposed on the gate insulating layer 135. The touch routing line 28 is composed of a lower layer 142 and an upper layer 144. The lower layer 142 is made of a semiconductor material and the upper layer 144 is made of a metal material. For example, the lower layer 142 may be formed of the same material as the aforementioned semiconductor layer 141 and the upper layer 144 may be formed of the same material as the aforementioned source electrode 46.

The aforementioned semiconductor layer 141, the source electrode 46, the drain electrode 44 and the touch routing line 28 are simultaneously formed using a half-tone mask. Specifically, a semiconductor material layer is formed on the substrate 100 and a metal layer is formed thereon. Then, the semiconductor material layer and the metal layer are simultaneously patterned using a half-tone mask to form the semiconductor layer 141, the source electrode 46, the drain electrode 44, and the lower layer 142 and the upper layer 144 of the touch routing line 28. The passivation layer 150 is disposed on the touch routing line 28 and the common electrode connector 63 is disposed on the passivation layer 150.

The common electrode connector 63 extended from the common electrode 62 of the first sub-pixel 110 is disposed in the repair portion 99 in which the touch routing line 28 and the pixel electrode 60 of the first sub-pixel 110 overlap. When laser is radiated to the repair portion, short-circuiting occurs between the common electrode connector 63 of the first sub-pixel 110 and the touch routing line 28, and the pixel electrode 60 of the first sub-pixel 110.

However, a touch driving voltage is applied to a touch electrode other than the touch electrode disposed in the first sub-pixel 110 through the touch routing line 28. Accordingly, if the touch routing line 28 is connected to the common electrode connector 63 extended from the common electrode 62 of the first sub-pixel 110, touch driving voltages of different touch electrodes are applied to the common electrode 62 of the first sub-pixel 110 and thus a touch sensing error may be generated.

Furthermore, the sub-pixel repair process may not be performed on the boundary between different touch electrodes.

Figure 8:
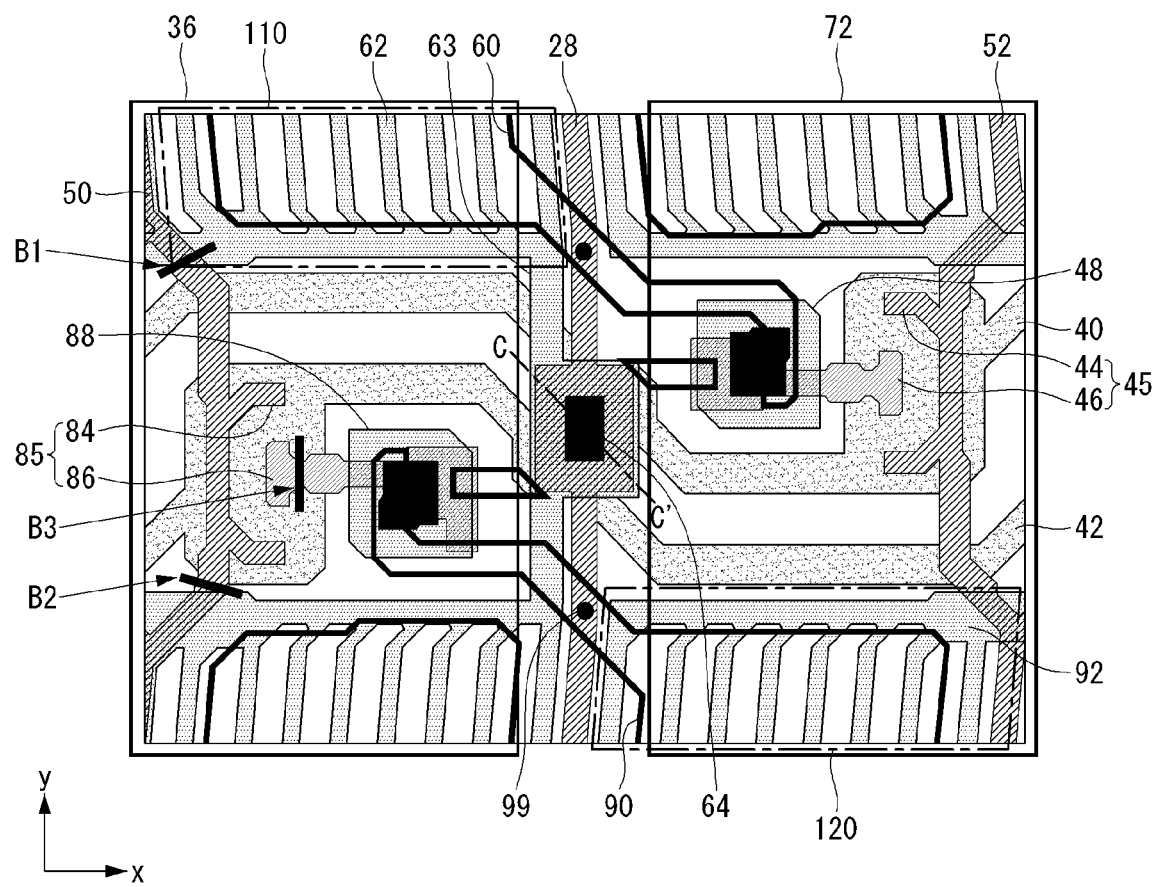
FIG. 8 is an enlarged plan view of an area R2 of FIG. 4 according to an embodiment of the present disclosure.
Figure 9:
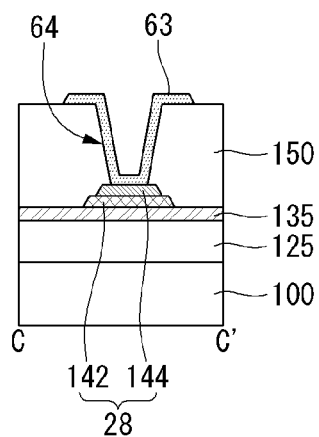
FIG. 9 is a cross-sectional view taken along line C-C' of FIG. 8 according to an embodiment of the present disclosure.

Hereinafter, a sub-pixel structure on the boundary between sub-pixels in the display device according to an embodiment of the present invention will be described with reference to FIG. 8. FIG. 8 is an enlarged plan view of an area R2 of FIG. 4 and FIG. 9 is a cross-sectional view taken along line C-C' of FIG. 8.

Referring to FIG. 4, the plurality of touch electrodes 26 are disposed in the display area AA of the display device according to an embodiment of the present disclosure. A touch routing line for driving touch electrodes on one side is disposed between touch electrodes disposed in the lower-most row of the display area AA. For example, a touch electrode disposed in the first row of the first column at the uppermost part of the display area AA is connected to the first touch routing line which is the left-most touch routing line, and a touch electrode disposed in the second row of the first column is connected to the second touch routing line. In addition, a touch electrode disposed in the last row of the first column is connected to the right-most touch routing line. Accordingly, the touch routing line connected to the touch electrode disposed in the last row of the first column is disposed adjacent to the touch electrode disposed in the last row of the second column.

Specifically, a relationship between sub-pixels of touch electrodes disposed in the last row of the first column and the last row of the second column and a touch routing line will be described with reference to FIG. 8.

Referring to FIG. 8, the first gate line 40 and the second gate line 42 extend in the first direction (x-axis direction). The touch routing line 28 is disposed to intersect the first gate line 40 and the second gate line 42. The first and second data lines 50 and 52 are disposed to intersect the first gate line 40 and the second gate line 42.

An area defined by the first data line 50, the first gate line 40 and the touch routing line 28 corresponds to the first sub-pixel 110. An area defined by the second data line 52, the second gate line 42 and the touch routing line 28 corresponds to a second sub-pixel 120. The first sub-pixel 110 is included in the aforementioned touch electrode 36 disposed in the last row of the first column and the second sub-pixel 120 is included in the touch electrode 72 disposed in the last row of the second column on the basis of the touch routing line 28.

The second sub-pixel 120 includes a thin film transistor 45 including the first gate line 40 serving as a gate electrode, a drain electrode 44 branched from the second data line 52, and a source electrode 46 opposite the drain electrode 44. The source electrode 46 of the thin film transistor 45 is in contact with a pixel electrode 60 through a contact hole 48. A common electrode 62 which forms electric fields along with the pixel electrode 60 is connected to the touch routing line 28 through a via hole 64 included in a region overlapping with the touch routing line 28. A common voltage and a touch driving voltage are applied to the common electrode 62 through the touch routing line 28. The common electrode 62 acts as the touch electrode 36 disposed in the last row of the first column and thus is connected to the common electrode of a sub-pixel (sub-pixel under the second gate line) neighboring in the direction in which the touch routing line 28 extends to be one body. For example, the common electrode 62 and the common electrode of the sub-pixel disposed thereunder become one body through the common electrode connector 63.

The first sub-pixel 110 includes a thin film transistor 85 including the second gate line 42 serving as a gate electrode, a drain electrode 84 branched from the first data line 50, and a source electrode 86 opposite the drain electrode 84. The source electrode 86 of the thin film transistor 85 is in contact with a pixel electrode 90 through a contact hole 88. A common electrode 92 which forms electric fields along with the pixel electrode 90 is connected to a touch routing line which is not shown. The common electrode 92 of the first sub-pixel 110 is connected to the touch routing line of the touch electrode 72 disposed in the last row of the second column to act as the touch electrode.

The thin film transistor 45 of the second sub-pixel 120 is disposed adjacent to the first sub-pixel 110, and the thin film transistor 85 of the first sub-pixel 110 is disposed adjacent to the second sub-pixel 120. Accordingly, the pixel electrode 60 of the first sub-pixel 110 extends to intersect the touch routing line 28 and is connected to the thin film transistor 45. The pixel electrode 90 of the first sub-pixel 120 extends to intersect the touch routing line 28 and is connected to the thin film transistor 85. This is a structure formed according to an arrangement of sub-pixels for DRD.

A cross-sectional structure of a connector between the touch routing line and the common electrode, taken along line C-C' of FIG. 8, will be described with reference to FIG. 9.

Referring to FIG. 9, the buffer layer 125 is disposed on the substrate 100 and the gate insulating layer 135 is disposed on the buffer layer 125. The touch routing line 28 is disposed on the gate insulating layer 135. The touch routing line 28 is composed of the lower layer 142 and the upper layer 144. The lower layer 142 is made of a semiconductor material and the upper layer 144 is formed of a metal material.

The passivation layer 150 is disposed on the touch routing line 28 and includes the via hole 64 which exposes the touch routing line 28. The common electrode connector 63 extended from the common electrode 62 of the first sub-pixel 110 is disposed on the passivation layer 150 in which the via hole 64 is formed. The common electrode connector 63 is in contact with the touch routing line 28 through the via hole 64.

Meanwhile, sub-pixels disposed on boundaries of different touch electrodes shown in FIG. 8 have a structure that cannot be repaired.

Referring to FIG. 8, the touch routing line 28 intersects the pixel electrode 60 of the first sub-pixel 110 and the pixel electrode 90 of the second sub-pixel 120. For repairing, areas in which at least two laser spots are disposed at the intersection of the touch routing line 28 and the pixel electrode 60 of the first sub-pixel 110 and the intersection of the touch routing line 28 and the pixel electrode 90 of the second sub-pixel 120 are required. However, the areas of the intersections of the pixel electrodes 60 and 90 are small because the touch routing line 28 is narrow and thus it is difficult to arrange laser spots for repairing in the areas.

Hereinafter, a display device capable of preventing and repairing a touch sensing error according to the present invention will be described.

Figure 10:
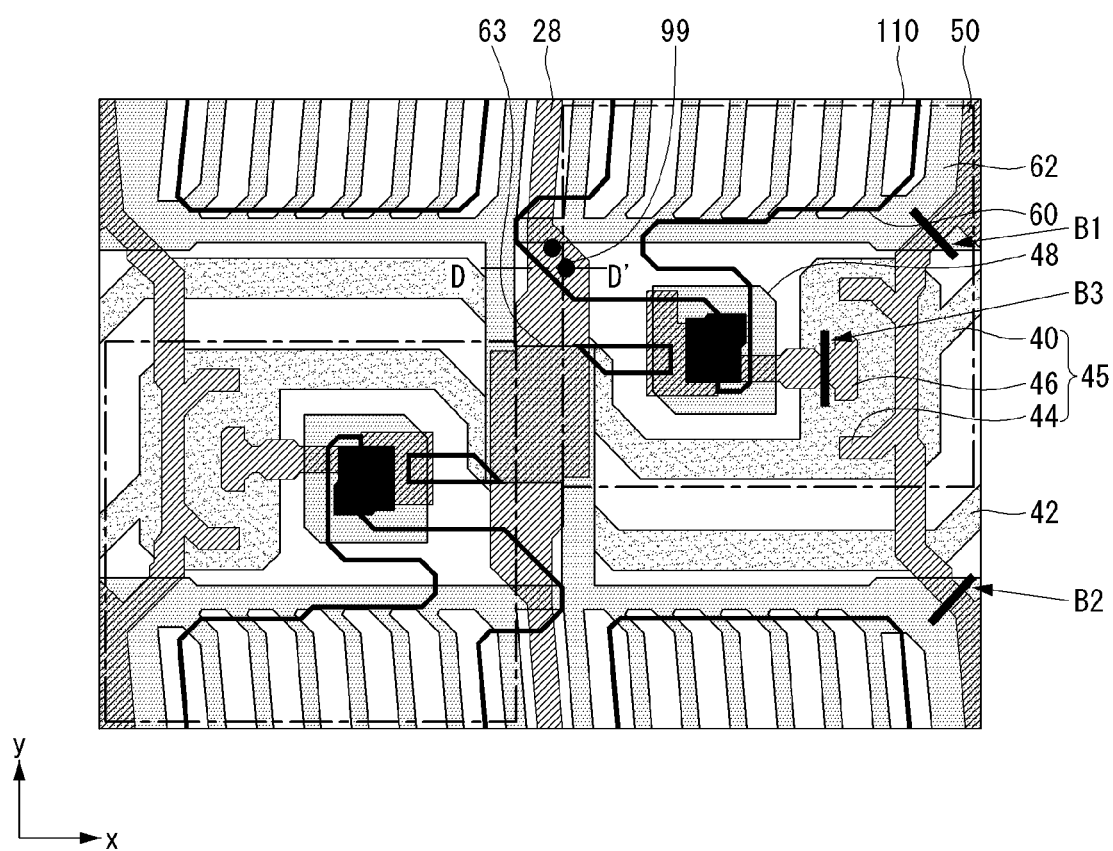
FIG. 10 is a plan view showing some sub-pixels of a display device according to an embodiment of the present disclosure.
Figure 11:
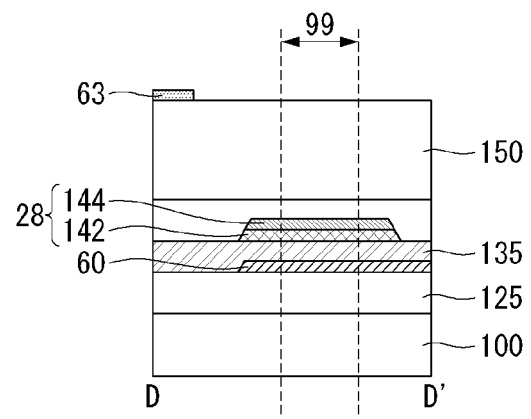
FIG. 11 is a cross-sectional view taken along line D-D' of FIG. 10 according to an embodiment of the present disclosure.

A structure of a sub-pixel disposed at the center of a touch electrode in a display device according to an embodiment of the present disclosure will be described with reference to FIGS. 10 and 11. FIG. 10 is a plan view showing some sub-pixels of the display device according to an embodiment of the present disclosure and FIG. 11 is a cross-sectional view taken along line D-D' of FIG. 10.

Referring to FIG. 10, first and second gate lines 40 and 42 extend in the first direction (x-axis direction). A touch routing line 28 is disposed to intersect the first and second gate lines 40 and 42. A first data line 50 is disposed to intersect the first and second gate lines 40 and 42.

An area defined by the first data line 50, the first gate line 40 and the touch routing line 28 corresponds to a first sub-pixel 110. The touch routing line 28 is not connected to the touch electrode (common electrode) in which the first sub-pixel 110 is disposed and is connected to a touch electrode disposed at another position of the first column.

The first sub-pixel 110 includes a thin film transistor 45 including the first gate line 40 serving as a gate electrode, a drain electrode 44 branched from the first data line 50, and a source electrode 46 opposite the drain electrode 44. The source electrode 46 of the thin film transistor 45 is in contact with a pixel electrode 60 through a contact hole 48. A common electrode 62 which forms electric fields along with the pixel electrode 60 is connected to a touch routing line which is not shown such that a common voltage and a touch driving voltage are applied to the common electrode 62. The common electrode 62 acts as a touch electrode disposed in the last row of the first column and thus is connected to common electrodes of neighboring sub-pixels, which are included in the same touch electrode, to be one body.

The cross-sectional structure of a repair portion is described with reference to FIG. 11. The touch routing line 28 overlaps with the pixel electrode 60 of the first sub-pixel 110 but does not overlap with the common electrode connector 63 extended from the common electrode 62 of the first sub-pixel 110. In the present embodiment, the common electrode connector 63 of the first sub-pixel 110 is disposed such that it does not overlap with the touch routing line 28 and the pixel electrode 60 of the first sub-pixel 110 at the repair portion 99.

A touch driving voltage is applied through the touch routing line 28 to a touch electrode other than the touch electrode in which the first sub-pixel 110 is disposed. Accordingly, when the common electrode connector 63 extended from the common electrode of the first sub-pixel 110 is connected to the touch routing line 28, touch driving voltages of different touch electrodes are applied to the common electrode 62 of the first sub-pixel 110 and thus a touch sensing error may be generated.

Accordingly, the present disclosure can reduce generation of a touch sensing error by arranging the common electrode connector 63 of the first sub-pixel 110 such that the touch routing line 28 and the common electrode connector 63 do not overlap at the repair portion 99.

Figures 12A, 12B:
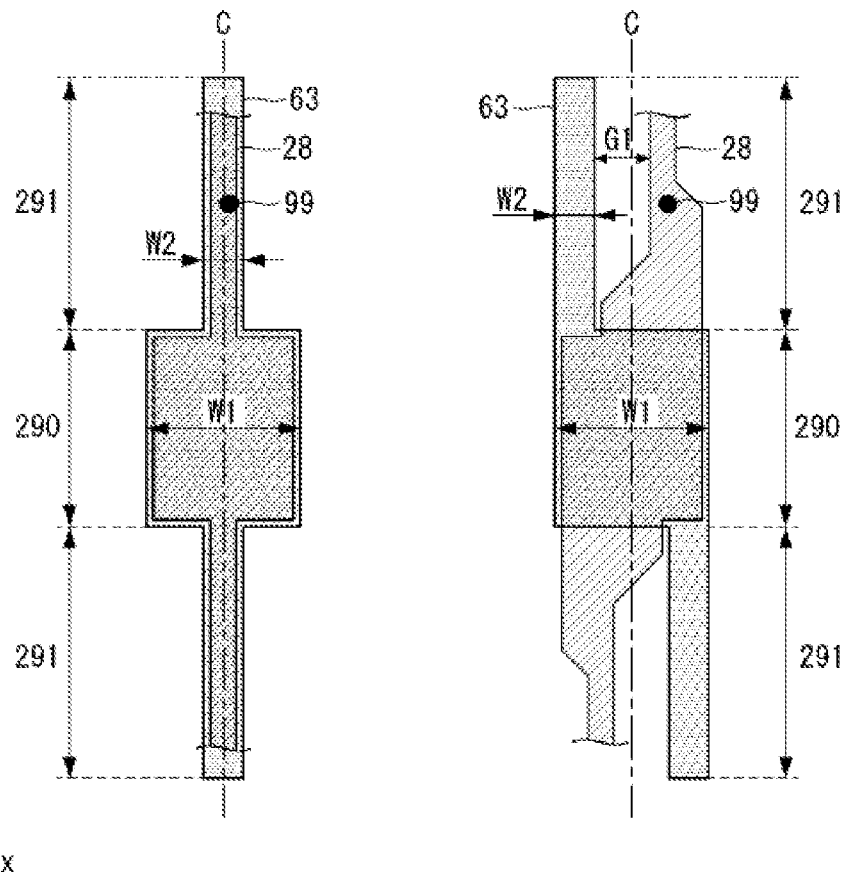
FIGS. 12A and 12B are diagrams showing shapes of a common electrode connector according to an embodiment of the present disclosure.

To this end, the present disclosure changes the shape of the common electrode connector 63 and the shape of the touch routing line 28. FIGS. 12A and 12B are diagrams showing shapes of the common electrode connector and FIGS. 13A and 13B are diagrams showing shapes of the touch routing line.

FIG. 12A shows the common electrode connector 63 and the touch routing line 28 illustrated in FIG. 5. The common electrode connector 63 includes a center part 290 having a first width W1 and line parts 291 which are extended from the center part 290 to one side and the other side and have a second width W2. The first width W1 of the center part 290 is wide enough such that a hole through which the common electrode connector is connected to the touch routing line can be formed. The line parts 291 serve as an interconnection line and are narrower than the first width W1. Particularly, the line parts 291 are disposed such that they overlap with a center line C that passes through the center of the center part 290. That is, the line parts 291 are symmetrically disposed on the basis of the center line C of the center part 290. In FIG. 12A, the line part 291 of the common electrode connector 63 is overlapped with the touch routing line 28. The repair portion 99 is positioned on the line part 291 of the common electrode connector 63. Therefore, when laser welding is performed on the repair portion 99, the pixel electrode 60 may be connected to the common electrode connector 63 as well as the touch routing line 28.

FIG. 12B shows the common electrode connector 63 and the touch routing line 28 illustrated in FIG. 10. The common electrode connector 63 includes a center part 290 having a first width W1 and line parts 291 which are extended from the center part 290 to one side and the other side and have a second width W2. The first width of the center part 290 is greater than the second width W2. A structural difference from the above-described common electrode connector shown in FIG. 12A is that the line parts 291 are disposed such that they do not overlap with the center line C that passes through the center of the center part 290. Specifically, the line part 291 upwardly protruding from the center part 290 is disposed on the left of the center line C and the line part 291 downwardly protruding from the center part 290 is disposed on the right of the center line C on the basis of the center line C of the center part 290. That is, the line parts 291 are symmetrical on the basis of the center line C.

In FIG. 12B, the line part 291 of the common electrode connector 63 is spaced apart from the touch routing line 28 with a predetermined distance G1 interposed therebetween so that the line part 291 is not overlap with the touch routing line 28. The repair portion 99 is positioned on the touch routing line 28 that is not overlapped with the line part 291 of the common electrode connector 63. Therefore, when the laser welding is performed in the repair portion 99, the pixel electrode 60 is connected to the touch routing line 28. When the laser welding is performed, the line part 291 of the common electrode connector 63 is not connected to the touch routing line 28 because the line part 291 is spaced apart from the repair portion 99.

Accordingly, the common electrode connector 63 having the aforementioned structures as shown in FIG. 12B does not overlap with the touch routing line 28 at the repair portion 99 as shown in FIG. 10, and thus a touch sensing error can be prevented.

In addition, FIG. 13A shows the touch routing line 28 illustrated in FIG. 5. The touch routing line includes a center part 300 having a third width W3 and line parts 310 which are extended from the center part 300 to one side and the other side and have a fourth width W4. The third width W3 of the center part 300 is wide enough such that a hole through which the touch routing line is connected to a touch routing line disposed thereunder can be formed. The line parts 310 serve as an interconnection line and are narrower than the third width W3. Particularly, the line parts 310 are disposed such that they overlap with a center line C that passes through the center of the center part 300. That is, the line parts 310 are symmetrically disposed on the basis of the center line C of the center part 300. The touch routing line has the same structure as the common electrode connector shown in FIG. 12A. Since the line part 310 is disposed on the center line C passing through the center of the center part 300, the line part 310 is overlapped the line part 291 of the common electrode connector portion 63. Therefore, when laser welding is performed on the repair portion 99, the touch routing line 28 may be shorted with the line part 291 of the common electrode connector 63.

FIG. 13B shows the touch routing line illustrated in FIG. 10. The touch routing line includes a center part 300 having a third width W3 and extended parts 320 which are extended from the center part 300 to one side and the other side and have a fifth width W5. The third width W3 of the center part 300 is greater than the fifth width W5. That is, the fifth width W5 of the extended parts 320 is less than the third width W3 of the center part 300. In addition, the touch routing line includes line parts 310 which are respectively extended from the extended parts 320 and have a fourth width W4. The fourth width W4 of the line parts 310 is less than the third and fifth widths W3 and W5. With respect to relationships between the sizes of the third to fifth widths W3, W4 and W5, the third width W3 is widest and the fourth width W4 is smallest. The fifth width W5 is less than the third width W3 and greater than the fourth width W4. The repair portion 99 may be positioned on a extended parts 320 of the touch routing line 28 that is not overlapped with the common electrode connector 63.

A structural difference from the touch routing line shown in FIG. 12B is that the extended parts 320 for securing an area in which repairing can be performed are additionally provided between the center part 300 and the line parts 310. Accordingly, the touch routing line 28 having the aforementioned structure can provide an area in which laser welding can be performed on the touch routing line 28 and the pixel electrode 60 of the first sub-pixel 110 in the repair portion 99, as shown in FIG. 10, thereby improving repair yield.

Figure 14:
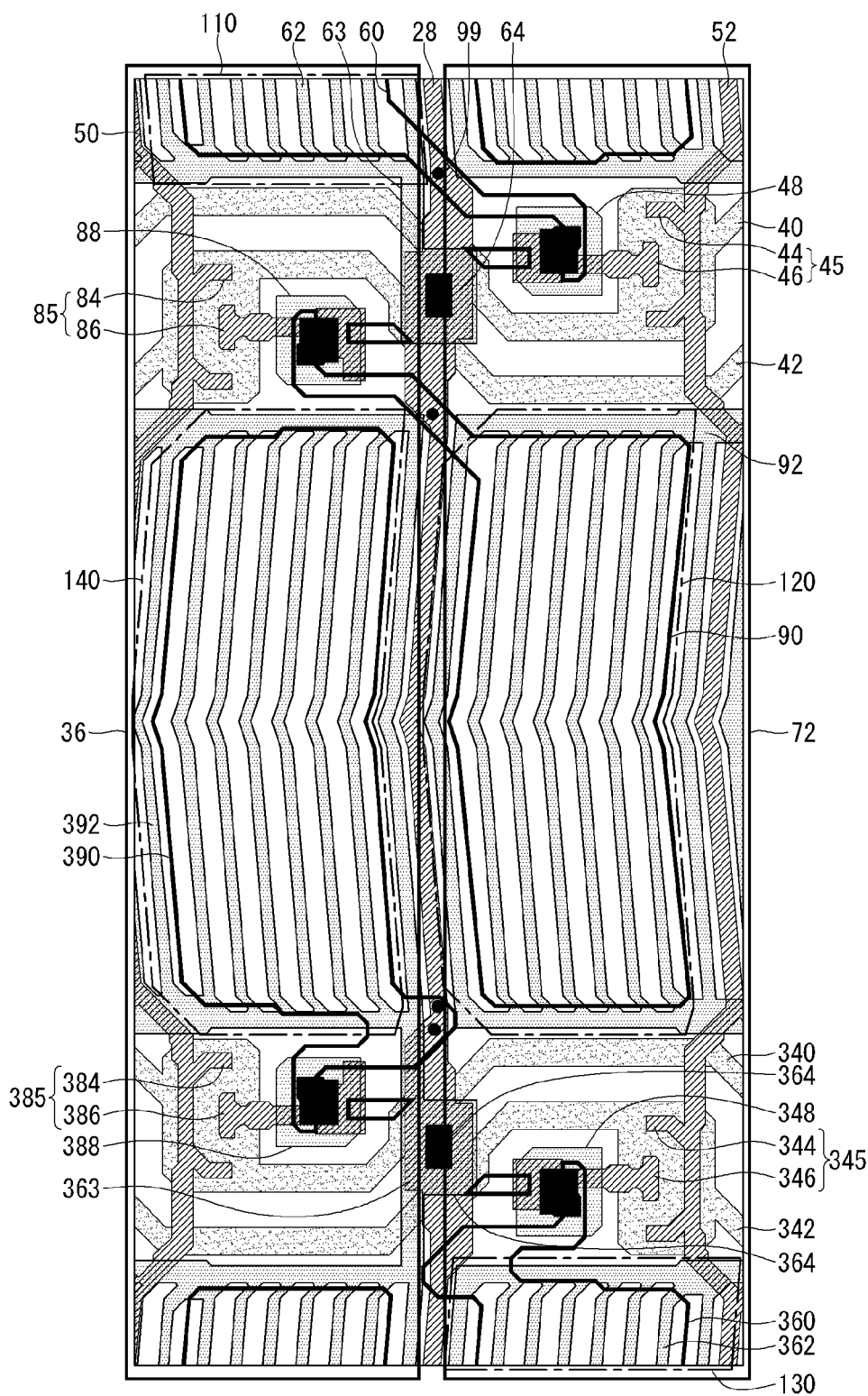
FIG. 14 is a plan view showing some sub-pixels according to an embodiment of the present disclosure.

Hereinafter, a sub-pixel structure on the boundaries of touch electrodes in the display device according to an embodiment of the present disclosure will be described with reference to FIG. 14. FIG. 14 is a plan view showing some sub-pixels according to an embodiment of the present invention and FIG. 15 is a plan view showing common electrode connectors shown in FIG. 14.

Specifically, a relationship between sub-pixels of a touch electrode disposed in the last row of the first column and a touch electrode disposed in the last row of the second column and a touch routing line will be described with reference to FIG. 14.

Referring to FIG. 14, the first gate line 40 and the second gate line 42 extend in the first direction (x-axis direction). The touch routing line 28 is disposed to intersect the first gate line 40 and the second gate line 42. The first data line 50 and the second data line 52 are disposed to intersect the first gate line 40 and the second gate line 42.

An area defined by the first data line 50, the first gate line 40 and the touch routing line 28 corresponds to the first sub-pixel 110. An area defined by the second data line 52, the second gate line 42 and the touch routing line 28 corresponds to the second sub-pixel 120. The first sub-pixel 110 is included in the aforementioned touch electrode 36 disposed in the last row of the first column and the second sub-pixel 120 is included in the touch electrode 72 disposed in the last row of the second column on the basis of the touch routing line 28.

The first sub-pixel 110 includes the thin film transistor 45 including the first gate line 40 serving as a gate electrode, the drain electrode 44 branched from the second data line 52, and the source electrode 46 opposite the drain electrode 44. The source electrode 46 of the thin film transistor 45 is in contact with the pixel electrode 60 through the contact hole 48. The common electrode 62 which forms electric fields along with the pixel electrode 60 is in contact with the touch routing line 28 through the via hole 64 included in a region overlapping with the touch routing line 28. A common voltage and a touch driving voltage are applied to the common electrode 62 through the touch routing line 28. The common electrode 62 acts as the touch electrode 36 disposed in the last row of the first column and thus is connected to a common electrode of a neighboring sub-pixel (sub-pixel disposed thereunder) to be one body. For example, the common electrode 62 and the common electrode of the sub-pixel disposed thereunder are integrated into one body through the common electrode connector 63.

The second sub-pixel 120 includes the thin film transistor 85 including the second gate line 42 serving as a gate electrode, the drain electrode 84 branched from the first data line 50, and the source electrode 86 opposite the drain electrode 84. The source electrode 86 of the thin film transistor 85 is in contact with the pixel electrode 90 through the contact hole 88. The common electrode 92 which forms electric fields along with the pixel electrode 90 is in contact with a touch routing line which is not shown. The common electrode 92 of the second sub-pixel 120 is connected to the touch routing line of the touch electrode 72 disposed in the last row of the second column to act as the touch electrode.

The thin film transistor 45 of the first sub-pixel 110 is disposed adjacent to the second sub-pixel 120, and the thin film transistor 85 of the second sub-pixel 120 is disposed adjacent to the first sub-pixel 110. Accordingly, the pixel electrode 60 of the first sub-pixel 110 extends to intersect the touch routing line 28 and is connected to the thin film transistor 45. The pixel electrode 90 of the second sub-pixel 120 extends to intersect the touch routing line 28 and is connected to the thin film transistor 85. This is a structure formed according to an arrangement of sub-pixels for DRD.

A third sub-pixel 130 is disposed under the second sub-pixel 120 and a fourth sub-pixel 140 is disposed on the left side of the second sub-pixel 120.

Specifically, a third gate line 340 and a fourth gate line 342 extend in the first direction (x-axis direction). The touch routing line 28 is disposed to intersect the third and fourth gate lines 340 and 342. The first data line 50 and the second data line 52 are disposed to intersect the third and fourth gate lines 340 and 342.

An area defined by the first data line 50, the third gate line 340 and the touch routing line 28 corresponds to a fourth sub-pixel 140. An area defined by the second data line 52, the fourth gate line 342 and the touch routing line 28 corresponds to a third sub-pixel 130. The touch routing line 28 is connected to a touch electrode (common electrode) in which the fourth sub-pixel 140 is disposed and is not connected to a touch electrode (common electrode) in which the third sub-pixel 130 is disposed.

The third sub-pixel 130 includes a thin film transistor 345 including the fourth gate line 342 serving as a gate electrode, a drain electrode 344 branched from the second data line 52, and a source electrode 346 opposite the drain electrode 344. The source electrode 346 of the thin film transistor 345 is in contact with a pixel electrode 360 through a contact hole 348. A common electrode 362 which forms electric fields along with the pixel electrode 360 is connected to a touch routing line which is not shown and thus a common voltage and a touch driving voltage are applied to the common electrode 362. The common electrode 362 is included in the touch electrode 72 and thus connected to common electrodes of neighboring sub-pixels, which are included in the same touch electrode, to be one body.

The fourth sub-pixel 140 includes a thin film transistor 385 including the third gate line 340 serving as a gate electrode, a drain electrode 384 branched from the first data line 50, and a source electrode 386 opposite the drain electrode 384. The source electrode 386 of the thin film transistor 385 is in contact with a pixel electrode 390 through a contact hole 388. A common electrode 392 which forms electric fields along with the pixel electrode 390 is connected to the touch routing line 28 such that a common voltage and a touch driving voltage are applied to the common electrode 392. The common electrode 392 is included in the touch electrode 36 and thus connected to common electrodes of neighboring sub-pixels, which are included in the same touch electrode, to be one body.

Meanwhile, the common electrode 62 of the first sub-pixel comes into contact with the touch routing line 28 through the via hole 64 included in a region overlapping with the touch routing line 28 through the common electrode connector 63. Here, the common electrode connector 63 is formed in a different shape from the aforementioned common electrode connector 63 shown in FIG. 12(*b*). The corresponding touch routing line 28 is connected to the touch electrode 36 disposed on the left of the touch routing line 28, and when this is connected to the touch electrode 72 disposed on the right thereof, touch error is generated. Accordingly, one side of the common electrode connector 63 is connected to the common electrode 62 of the first sub-pixel 110 and the other side thereof is connected to the touch routing line 28 without being connected to common electrodes of other sub-pixels in the present invention.

Referring to FIG. 15A, the common electrode connector includes a center part 290 having a first width W1 and a line part 291 which are extended from the center part 290 to one side and has a second width W2. The first width W1 of the center part 290 is greater than the second width W2. A structural difference from the aforementioned common electrode connector shown in FIG. 12B is that the line part 291 is disposed on the left side of the center line C and formed only on one side of the center part 290. This is because the touch routing line 28 is connected to the touch electrode 36 disposed on the left side of the touch routing line 28 and thus the line part 291 can be disposed on the left side to be connected to the common electrode 62 of the first sub-pixel 110 disposed on the left side of the touch routing line 28. In addition, the line part 291 is disposed only on one side of the center part 290 to prevent laser radiation time increase and processability deterioration during repairing performed in the repair portion 99 under the via hole 64 according to the common electrode connector disposed at the uppermost level.

In addition, the common electrode 392 of the fourth sub-pixel 140 comes into contact with the touch routing line 28 through the via hole 364 included in a region overlapping with the touch routing line 28 through a common electrode connector 363. Here, the common electrode connector 363 is formed in a different shape from the aforementioned common electrode connector 63 shown in FIG. 12B. The corresponding touch routing line 28 is connected to the touch electrode 36 disposed on the left of the touch routing line 28, and when this is connected to the touch electrode 72 disposed on the right thereof, touch error is generated. Accordingly, the common electrode connector 63 may be formed in a structure in which the common electrode connector 63 connects the common electrode 62 of the first sub-pixel 110 to the common electrode of the fourth sub-pixel 140 in the present invention.

Referring to FIG. 15B, the common electrode connector includes a center part 290 having a first width W1 and line parts 291 which are extended from the center part 290 to one side and the other side and have a second width W2. The first width W1 of the center part 290 is greater than the second width W2. A structural difference from the aforementioned common electrode connector shown in FIG. 12B is that the line parts 291 are disposed on the left side of the center line C. This is because the touch routing line 28 is connected to the touch electrode 36 disposed on the left side of the touch routing line 28 and thus both the line parts 291 can be disposed on the left side to connect the common electrode 62 of the first sub-pixel 110 disposed on the left side of the touch routing line 28 to the common electrode 392 of the fourth sub-pixel 140.

As described above, the display device according to embodiments of the present invention includes a common electrode connector which is formed in various structures for each touch electrode area and thus can prevent touch sensing error and allow a repair process to be performed.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
    a first data line disposed on a substrate;
    a touch routing line disposed in parallel with the first data line;
    a first gate line intersected the first data line and the touch routing line; and
    a first sub-pixel defined according to the intersection of the first data line, the touch routing line, and the first gate line,
    wherein the first sub-pixel includes a first thin film transistor disposed at the intersection of the first data line and the first gate line, a first pixel electrode connected to the first thin film transistor, and a first common electrode overlapped on the first pixel electrode,
    wherein the first common electrode includes a common electrode connector extending to a further sub-pixel, the touch routing line and the common electrode connector are disposed to overlap with each other, a repair portion is included in an area in which the pixel electrode and the touch routing line overlap, and the common electrode connector does not overlap with the touch routing line in the repair portion.

2. The display device according to claim 1, wherein the further sub-pixel is a second sub-pixel neighboring the first sub-pixel, and
wherein the display device further comprises a second data line disposed on a substrate, wherein the first and the second data lines are arranged in parallel with each other, and wherein the touch routing line is disposed between the first data line and the second data line and arranged in parallel with the first data line, and the second sub-pixel includes a second thin film transistor disposed at the intersection of the second data line and the second gate line, a second pixel electrode connected to the second thin film transistor, and a second common electrode overlapping with the second pixel electrode.

3. The display device according to claim 1, further comprising a second data line disposed on a substrate, wherein the first data line and the second data line are arranged in parallel with each other, and wherein the touch routing line is disposed between the first data line and the second data line and arranged in parallel with the first data line;
wherein a second sub-pixel is defined according to intersection of the second data line, the touch routing line and the second gate line, and wherein the second sub-pixel includes a second thin film transistor disposed at the intersection of the second data line and the second gate line, a second pixel electrode connected to the second thin film transistor, and a second common electrode overlapping with the second pixel electrode; and wherein the further sub-pixel is a third sub-pixel disposed adjacent to the first sub-pixel in a direction in which the touch routing line extends.

4. The display device according to claim 3, wherein the first common electrode of the first sub-pixel is electrically short-circuited with respect to the second common electrode of the second sub-pixel.

5. The display device according to any of claim 1, wherein the touch routing line is configured to apply a touch driving voltage to a touch electrode other than a touch electrode disposed in the first sub-pixel.

6. The display device according to any of claim 1, wherein the common electrode connector includes a center part and at least one line part extended to a first side from the center part.

7. The display device according to claim 6, wherein the line part is disposed on one side of a center line of the center part.

8. The display device according to claim 6, wherein the common electrode connector includes another line part extended to a second side from the center part, wherein the center part is disposed between the first side and the second side.

9. The display device according to claim 8, wherein the line part and the another line part of the common electrode connector are disposed on same side or on different sides with respect to a center line of the center part of the common electrode connector.

10. The display device according to any of claim 8, wherein the center part of the common electrode connector has a first width (W1), the line part and the another line part of the common electrode connector have a second width (W2), and the first width (W1) is greater than the second width (W2).

11. The display device according to claim 10, wherein the touch routing line includes a center part, extended parts respectively extended to one side and another side from the center part, and the line part and the another line part respectively extended from the extended parts.

12. The display device according to claim 11, wherein the center part of the touch routing line has a third width (W3), the extended parts of the touch routing line have a fifth width (W5), and the line part and the another line part of the touch routing line have a fourth width (W4),
wherein the third width (W3) is greater than the fourth width (W4) and the fifth width (W5) and the fifth width (W5) is greater than the fourth width (W4).

13. The display device according to claim 11, wherein the line part and the another line part of the common electrode connector do not overlap with the line parts of the touch routing line.

14. The display device according to claim 11, wherein the center part of the common electrode connector and the center part of the touch routing line overlap.

15. The display device according to any of claim 1, wherein the touch routing line is electrically short-circuited with respect to the first common electrode.

16. The display device according to claim 1, wherein the repair portion i make the first pixel electrode and the first common electrode electrically short-circuited.

17. A display device, comprising:
a first data line and a second data line disposed on a substrate and arranged in parallel with each other;
a touch routing line disposed between the first data line and the second data line and arranged in parallel with the first data line;
a first gate line and a second gate line intersected the first data line and the touch routing line;
a first sub-pixel defined according to intersection of the first data line, the touch routing line, and the first gate line; and
a second sub-pixel defined according to intersection of the second data line, the touch routing line, and the second gate line,
wherein the first sub-pixel includes a first thin film transistor disposed at the intersection of the second data line and the first gate line, a first pixel electrode connected to the first thin film transistor, and a first common electrode overlapping with the first pixel electrode,
the second sub-pixel includes a second thin film transistor disposed at the intersection of the first data line and the second gate line, a second pixel electrode connected to the second thin film transistor, and a second common electrode overlapping with the second pixel electrode,
the first common electrode of the first sub-pixel includes a common electrode connector that overlapping with the touch routing line,
a repair portion included in an area in which the first pixel electrode of the first sub-pixel and the touch routing line overlap, and
the common electrode connector does not overlap with the touch routing line in the repair portion.

* * * * *